Jan. 18, 1927.
R. E. McFARLAND
1,615,094
CORED ARTICLE AND METHOD OF PRODUCING SUCH ARTICLES
Filed Jan. 23, 1923
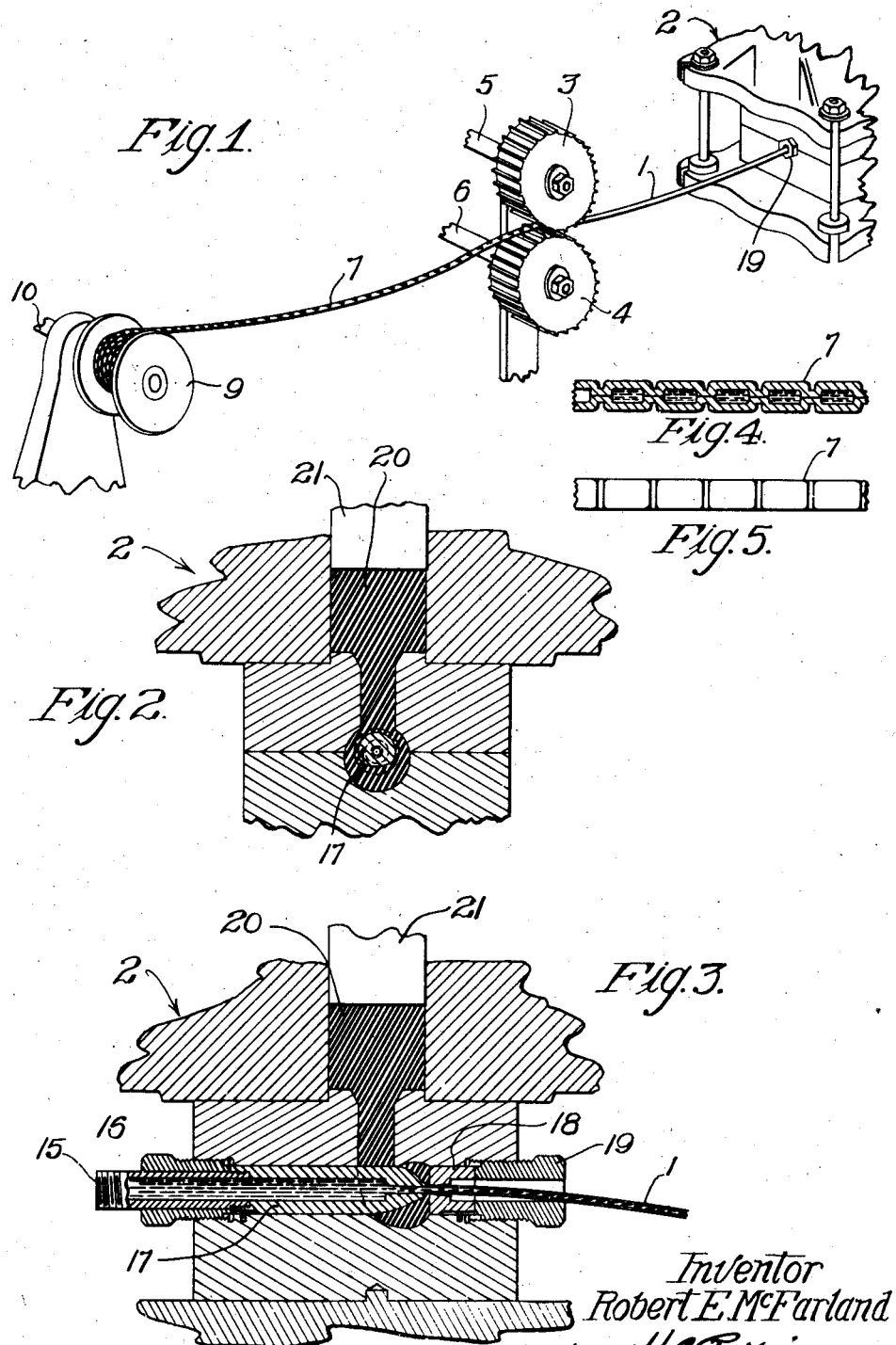
Inventor
Robert E. McFarland
by H. C. Pattison
Atty.

Patented Jan. 18, 1927.

1,615,094

UNITED STATES PATENT OFFICE.

ROBERT ERNEST McFARLAND, OF CICERO, ILLINOIS, ASSIGNOR TO WESTERN ELECTRIC COMPANY, INCORPORATED, OF NEW YORK, N. Y., A CORPORATION OF NEW YORK.

CORED ARTICLE AND METHOD OF PRODUCING SUCH ARTICLES.

Application filed January 23, 1923. Serial No. 614,357.

This invention relates to improvements in cored articles and methods of producing such articles.

This invention relates to cored articles and more particularly to an article in which the core is of fluid material.

In the manufacture of cored articles, especially articles in which the core is composed of material of fluid nature as in the case of flux cored solder wherein a fluid or liquid core is employed, it is desirable to prevent the escape of the core material while the article is being manufactured, during storage or while it is being used.

The principal object of the invention is to prevent the escape of core material from a cored article.

Another object is to indicate the proper amount of a cored article to be used in a single operation.

In order to accomplish these objects, in accordance with the features of the invention, the cored article upon being formed is passed through means for compressing the sheath or outer covering at lengthwise intervals so that the inside walls of the sheath come into engagement and separate the core material into independent sections, surrounded by the walls of the sheath material.

These and other features will be fully comprehended from the following description and the accompanying drawings, in which; Fig. 1 shows the apparatus for making the article; Fig. 2 is a cross sectional view of the die used in forming the cored article; Fig. 3 is a longitudinal sectional view of the die; Fig. 4 is a longitudinal sectional view of the cored article, and Fig. 5 is a plan view of a length of the article.

As shown in Fig. 1 the cored article such as a flux cored solder 1 is formed in the extruding apparatus, represented generally by the character 2, and then passes between the oppositely placed toothed wheels 3 and 4, which may be driven in a suitable manner by means of shafts 5 and 6 respectively. The teeth upon the rollers 3 and 4 are spaced to provide the proper amount of solder to be employed in one soldering operation, and the rollers are so arranged that as the cored solder passes between them the teeth squeeze the article at the proper points to produce the chain 7, as more fully shown in Figs. 4 and 5.

After passing between the rollers the crimped solder may be placed on a spool 9 mounted upon and driven by the shaft 10 which may be operated by any suitable motive means (not shown).

As shown more clearly in Figs. 2 and 3 the fluid or liquid core material is supplied through the pipe 15 secured in the forming mechanism 2 by means of the threaded bushing member 16, and passes through a nozzle 17.

In alinement with the opening in the nozzle 17 a die member 18 is provided and secured in the mechanism 2 by means of a threaded member 19. A supply 20 of the sheath material such as an ordinary solder composition placed in the mechanism 2 is forced downward by a plunger 21, actuated by any suitable means (not shown) in such a manner as to extrude the material 20 around the end of the nozzle 17 and through the die 18, thus completely surrounding the fluid core material which passes through the end of the nozzle.

It will be noticed that the squeezing action of the rollers 3 and 4 completely prevents any interchange of the fluid or liquid core between the compartments so formed in the sheath material. Thus during the manufacture or use the fluid core may escape only from the compartments which become opened.

In the use of cored articles such as flux cored solder, it is advisable to indicate to the operator the proper amounts of solder and flux to be used, since in some cases a long length may be necessary, and in other cases a shorter length may be sufficient. By so spacing the teeth on the rollers as to represent the lengths of flux cored articles needed in a single operation of a particular character the proper amount of solder and flux to be used will not be left to the discretion of the operator, thus insuring the making of a properly soldered joint without waste of materials.

For soldering small gauge wire to terminals of electrical apparatus it has been found that a spacing of ⅜" provides suitable amounts of flux and solder.

What is claimed is:

1. The method of making fluid core solder which comprises supplying the core material in a continuous stream, extruding solder therearound and crimping the core solder to prevent the escape of the core material.

2. The method of making a cored article which comprises extruding a sheath around a continuous core, and squeezing the sheath to divide the core into sections.

3. The method of making a cored article which comprises simultaneously forming a continuous core and extruding a sheath therearound, and separating portions of the core by portions of the sheath.

4. The method of making a cored article which comprises extruding a sheath around a liquid core and forming the sheath into independent compartments containing portions of the liquid core.

5. The method of making a cored article which comprises simultaneously forming a continuous core and surrounding the core with a sheath and then bringing into engagement the inner walls of the sheath to isolate sections of the core.

6. The method of making a cored article which comprises simultaneously forming a continuous core and extruding a sheath therearound, dividing the core into sections and separating the sections by portions of the sheath.

In witness whereof, I hereunto subscribe my name this 11th day of January A. D., 1923.

ROBERT ERNEST McFARLAND.